April 28, 1953 M. DEN HERTOG ET AL 2,636,945
TELEPHONE TRUNK SUPERVISION SYSTEM
Filed March 11, 1948
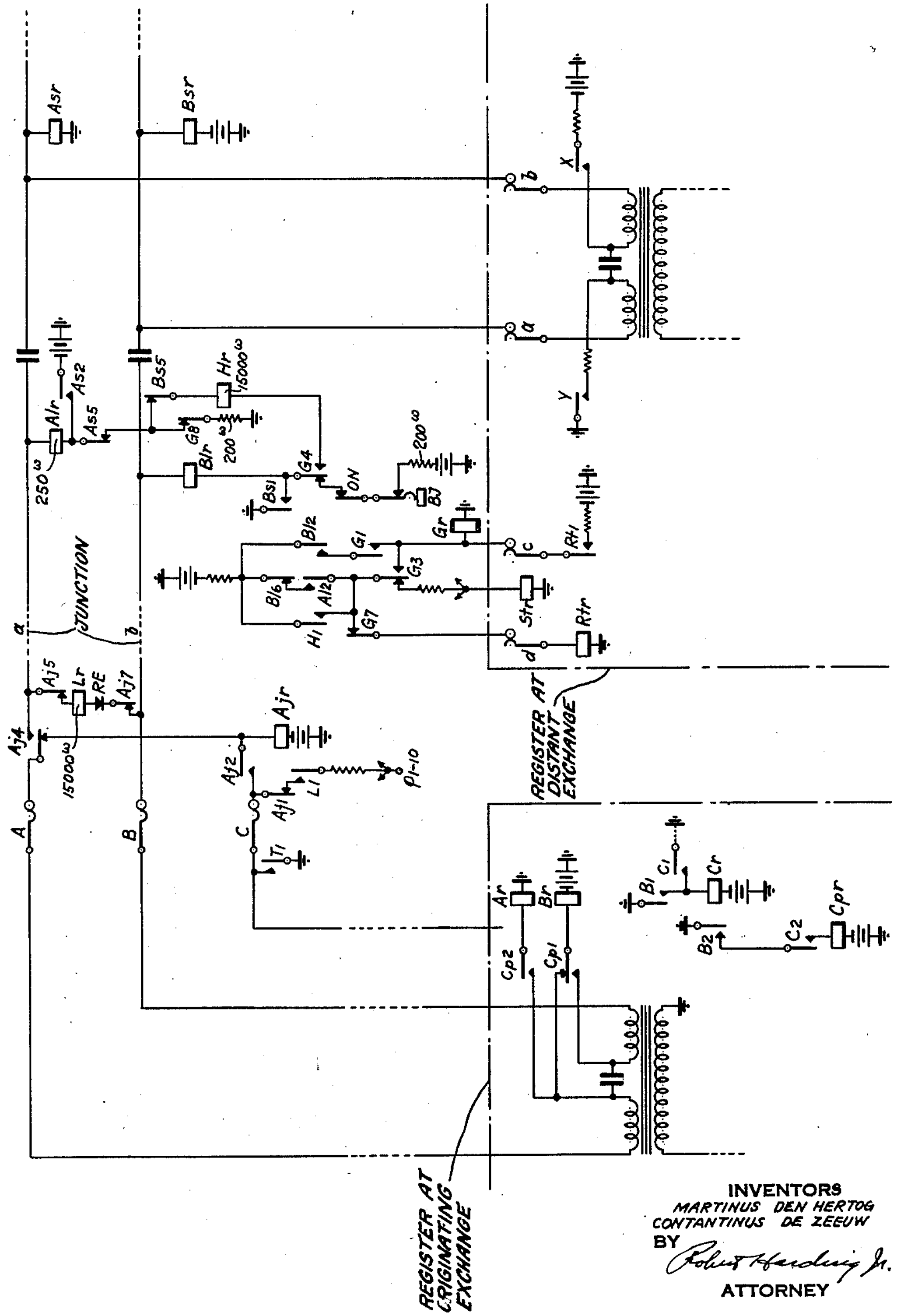
INVENTORS
MARTINUS DEN HERTOG
CONTANTINUS DE ZEEUW
BY Robert Harding Jr.
ATTORNEY Patented Apr. 28, 1953 2,636,945

UNITED STATES PATENT OFFICE 2,636,945

TELEPHONE TRUNK-SUPERVISION SYSTEM

Martinus den Hertog, Oude-God, and Constantinus de Zeeuw, Antwerp, Belgium, assignors to International Standard Electric Corporation, New York, N. Y., a corporation of Delaware Application March 11, 1948, Serial No. 14,294
In the Netherlands March 12, 1947

5 Claims. (Cl. 179—16)

The present invention relates to an automatic or semi-automatic telephone system or similar system for establishing connections and more in particular to a circuit arrangement, in which in a simple and reliable manner a register at a distant exchange may be connected up to an incoming junction at said exchange.

An object of the invention is to provide a safety circuit at the outgoing end of a two-wire junction for the working condition of the junction at a preceding exchange, and to take care, that this junction only becomes available as soon as the conditions of the circuits at the incoming end permit its release and thereby provide a check for the proper working condition of the junction.

A further object of the invention is to provide a system in which on one hand the connecting-up of the register takes place by predetermined switching actions at a preceding exchange, and on the other hand this connecting-up cannot take place as a result of particular faulty conditions which eventually may prevail on the junction.

Another object is to provide a system with apparatus to transmit a starting signal along the junction and to permit the transmission of a signal in reverse direction, to indicate the seizure of a register and to create the possibility, in response to the said signal transmission, of the equipment being brought into readiness for the subsequent transmission and control of voice frequency signals.

In another co-pending patent application Serial No. 731,136, filed February 26, 1947, a system has already been described in which two relays have been connected between the "a" and "b" conductors of the incoming end of the junction, if the junction is free, whereas in the register at the originating exchange these "a" and "b" conductors are connected to ground and battery, respectively, through separate windings of a relay.

As soon as the register at the originating exchange is connected to a free junction, one or both above-mentioned relays will operate to ground and battery via the register relay, creating the condition for connecting-up a register at the distant exchange.

Since one of these two relays has a high resistance, the relay at the register does not operate before the moment that a register has been connected and for this purpose connects a low resistance relay in parallel to both said relays.

If the junction is in normal or rest condition, the connection between both said relays is connected to battery through a low ohmic resistance and a grounded relay is now operated in the outgoing part of the junction via this battery and one of the junction leads, in order to signal the "free" condition of the junction to preceding group selectors.

This circuit arrangement however has some detriments. For example the relay at the outgoing part could be operated even if the junction was not in the proper working condition e. g. as a consequence of an interruption of, or a ground connection on the other not mentioned junction lead. Furthermore the presence of battery via a low resistance on one of the junction leads would cause a premature operation of the said relay at the register through the grounded winding thereof, before a register at the distant exchange had been seized.

In accordance with the invention one lead is connected to ground via a relay at the incoming end at the distant exchange and the other lead through a relay to battery, whilst at the outgoing end of the junction a high ohmic relay between both leads will operate to these potentials and will indicate the condition that the junction is available, and furthermore the signal for seizing a register at the distant exchange consists of connecting battery to one lead of the junction and the grounded relay will operate to render this signal operative, whilst the second relay, connected to battery, is not allowed to operate, whereupon after the seizure of the register, a third relay at the incoming end of the junction is energized from the register, opens the above mentioned connections of ground and battery to both first mentioned relays, respectively, and replaces these by a loop including both first mentioned relays plus a high ohmic relay in series.

In accordance with another characteristic feature of the invention, a relay responding to the closure of this loop at the register of the originating exchange and operated in series with said battery of the starting signal, may release and thus effect that this lead is connected to ground via a relay, whilst the other lead is connected to battery via the first mentioned relay, the result being, that of the three relays which are connected in non-operated loop between the junction leads at the incoming end of the junction, the high ohmic relay receives sufficient operating current to operate and also closes a locking circuit for said third relay which holds the connection at the incoming end.

Moreover in accordance with a characteristic feature of the invention the revertive D. C. signalling along each of the junction leads separately or along both leads simultaneously becomes possible, in such a way that the battery potential may now be connected to a first relay at the incoming end of the junction, which previously was connected to ground in rest condition, and furthermore the second relay, which in rest condition was connected to battery, may now be connected to ground, whereby these said relays will be energized and will take over the locking circuit for the third relay from the high ohmic series relay at the incoming end of the junction.

In the circuit to battery of the secondly mentioned relay at the incoming end, there may be included an off-normal contact of the selector and an insulating jack, so that by opening one of these two contacts the parallel connected relay at the outgoing end of the junction is de-energized and thus blocks the junction to subsequent seizure.

In series with this last mentioned parallel connected relay there may be provided a valve in such a way that this relay is only able to operate if the polarities in accordance with the rest condition, have been connected to the incoming end of the junction.

The invention will described with reference to the accompanying drawing in which parts of both registers at the ends of the junction, and also an outgoing selector have been schematically shown but those parts have been omitted, which are not essential for the invention.

In the rest condition of the junction and assuming that the incoming circuit and the line itself are in working condition, a circuit is closed for a relay L*r* at the outgoing side of the line from battery through a resistance of 200 ohms insulating jack BJ off normal contact ON of the (not shown) selector associated with the line break contact G4, winding B*lr*, "*b*" conductor, break contact A*j*7, rectifier RE, winding L*r*, break contact A*j*5, "*a*" conductor, winding A*lr*, break contacts A*s*5 and G8 to ground. In this circuit only the high ohmic relay L*r* will operate, which at its make contact L1 connects test potential at the preceding selector multiple via a break contact A*j*1, so that the junction may be seized by a selector. This test potential may be advantageously a phase of a multi-phase source, as described in Patent No. 2,452,578.

Assuming that a selector seizes this junction in a manner which will not further be described, relay A*jr* will operate at the outgoing end, which is not shown in detail on the drawing. Relay A*jr* is locked at its make contact A*j*2 to ground, provided at contact T1 in the selector. Moreover relay L*r* is disconnected from the line at break contacts A*j*5 and A*j*7, whilst the "*a*" conductor is connected through via the change-over contact A*j*4.

In addition relay A*jr* opens the test circuit via break contact A*j*1.

The register circuit at the originating exchange is now metallically connected through to the incoming circuit at the distant exchange and at the moment that a register at the distant exchange is connected to the junction, the following circuit is closed over the "*a*" conductor: battery, winding B*r*, break contact C*p*1, transformer winding, "*a*" conductor, winding A*lr*, break contacts A*s*5 and G8 to ground. In this circuit the relays B*r* and A*lr* will both operate. B*r* closes at make contact B1 a circuit for relay C*r*, which now operates and locks at make contact C1. Relay A*lr* closes circuits for the starting relay S*tr* and for the connecting of test potential in the "*d*" arc of the register link finders from battery, break contact B*l*6, make contact A*l*2 and hence to the starting relay S*tr* via break contact G3 and resistance of 800 ohms and in parallel therewith to the test terminal via break contact G7. The link finders of free registers hunt in search of the calling junction in a manner not further described and as soon as one of these is successful, the test relay R*tr* operates, stopping the finder and closing a circuit from battery via make contact R*t*1, and wiper C for relay G*r*, which operates. G*r* opens the ground to the "*a*" conductor at break contact G8, whilst at change-over contact G4 the battery to the "*b*" conductor is disconnected and the three relays B*lr*, H*r* and A*lr*, are connected in a loop across the "*a*" and "*b*" conductors. As a result relay B*r* de-energises at the register of the originating exchange and this energises a relay C*pr* via break contact B2 and make contact C2, whereby, via make contact C*p*2, relay A*r* is connected to the "*a*" conductor, and via make contact C*p*1, relay B*r* is connected to the "*b*" conductor. As a consequence of these connections the high ohmic relay H*r* will operate, which, via make contact H1, closes a locking circuit for relay G*r* at make contact G3. In this condition neither the relays A*lr* and B*lr*, nor the relays A*r* and B*r* are operated.

The operation of G*r* also caused the circuits for the starting relay S*tr* and for the test potential to be opened at break contacts G3 and G7 respectively. By closing the contacts X and Y respectively, different signals may now be sent from the register at the distant exchange to the register at the originating exchange.

When closing contact X the relay A*sr* will operate, which applies direct batery to the winding of relay A*lr* via break contact A*s*2, so that this relay operates in series with A*r* whilst relay H*r* is short-circuited and releases. The locking circuit for G*r* is now taken over by A*lr* via break contact B*l*6 and make contacts A*l*2 and G3.

When closing contact Y, relay B*sr* will operate, which applies direct ground to the winding of relay B*lr* via make contact B*s*1. B*lr* operates in series with B*r*, whereby the first mentioned relay takes over the locking circuit of G*r* via make contacts B*l*2 and G1, whilst H*r* also releases by being short-circuited.

If the contacts X and Y are closed simultaneously, both above mentioned circuits are closed simultaneously by A*sr* and B*sr* via the "*a*" and "*b*" conductors, so that A*lr*, B*lr*, A*r* and B*r* all operate.

The locking circuit for G*r* is now closed by B*lr*.

From the foregoing it will be clear, that at will signals may be transmitted via "*a*" and/or "*b*" conductors, such as is required for the further functioning e. g. for the transmission of digital impulses by voice frequency signals, whereby in any case G*r* remains operated. The function of this relay is to hold the connection at the incoming end of the junction and this relay will not release before the connection at the outgoing end has been liberated by opening battery and ground.

The signal, indicating that the register has been connected up at the incoming end, consists hereof, that in the manner described above, the battery and ground are opened at the incoming end and are replaced by a loop, whilst one signal, indicating the readiness of the register at the incoming end to receive voice frequency signals may e. g. consist hereof, that by closing contact X, the circuit is closed via the "*a*" conductor.

Assuming, that the junction is in rest condition, the following abnormal conditions may prevent the operation of relay Lr, so that the junction does not become available at the outgoing end:

(a) Absence of battery potential at the incoming end of the junction;

(b) The selector at the incoming end is not in the rest condition;

(c) the circuit at the incoming end is insulated by inserting a plug into the jack BJ.

(d) The "a" and/or "b" conductors of the junctions have been interrupted.

(e) a direct short-circuit or a low resistance bridge is prevailing between the "a" and "b" conductors, so that relay Lr is short-circuited or cannot operate respectively.

(f) A direct ground of a low resistance ground is present on the "b" conductor, thus preventing relay Lr from operating.

(g) For some reason or other the incoming end of the junction is maintained in the conversational condition, whereby the relays Gr, Asr and Bsr are operated, because in this case the direction of the potential on the junction is reversed and thus the current can flow through rectifier RE in series with relay Lr.

In the above mentioned application Serial No. 731,136 the possibilities (d) to (g) inclusive had not been taken into account.

It will be clear from the foregoing that a register at the incoming end can only be seized by connecting battery potential via the "a" conductor. The faulty connection of a register as a result of faults in the junction cannot take place in the following cases:

(a) Ground on "a" and/or "b" conductors.

(b) Short-circuit or low resistance bridge between "a" and "b" conductors, since in this case Blr will operate together with Alr and annul the function of the latter relay via break contact Bl6.

(c) Battery on the "b" conductor.

It also follows that in accordance with the invention, a large degree of safety is provided by simple means.

The invention is in no way restricted to the specific circuit arrangement shown.

We claim:

1. An automatic telephone system comprising a plurality of exchanges including an originating exchange and a distant exchange, a two-wire junction for interconnecting said exchanges, a first relay, means for normally connecting said first relay between ground and one wire of said junction at the end of said junction adjacent said distant exchange, a source of potential having one pole connected to ground, a second relay, means for normally connecting said second relay between the other pole of said source of potential and the other wire of said junction at the same end thereof, a third relay having a high ohmic resistance compared to said first and second relays, means for normally connecting said third relay between said wires of said junction at the end of said junction adjacent said originating exchange, the relative resistance of said relays being such that said third relay will operate on the current flowing between said wires caused by said source of potential but said first and second relays will not operate, means for disconnecting said third relay from between said wires when said junction is seized by the originating exchange, a second source of potential at the originating exchange, means at the originating exchange for connecting said second source of potential between said one wire of said junction and ground so as to energize said first relay, a register at the distant exchange, means controlled by said first relay for seizing said register at the distant exchange, a fourth relay having a high ohmic resistance with respect to said first and second relays, means controlled by the seized register for releasing said first relay and connecting said fourth relay in series with said first and second relays between the wires of said junction, and means at the originating exchange responsive to the operation of said last-mentioned means for connecting said second source of potential across said wires, said second source being of such value as to energize said fourth relay but not said first or second relays.

2. A system, as claimed in claim 1, in which a fifth relay is provided at the originating exchange connected between the one wire and the second source of potential, so as to operate when said first relay operates, and in which the means at the originating exchange for connecting said second source of potential across the wires so as to energize said fourth relay is responsive to the release of said fifth relay and includes the circuit of said fifth relay.

3. A system, as in claim 2, in which a sixth relay is provided at the originating exchange, and means is provided for connecting said sixth relay between ground and the one wire of said junction under control of the means for connecting the second source of potential across the wires of said junction, a third source of potential, and means is provided under control of the register at the distant exchange for breaking the circuit between said first and fourth relays and connecting said third source of potential between ground and said first relay so as to energize said first relay and said sixth relay at said originating exchange, thus sending a signal from the distant exchange to the originating exchange, and in which further means is provided under control of the register at the distant exchange for breaking the circuit between said first relay and said fourth relay and connecting ground to said second relay so as to operate said second relay and said fifth relay at the originating exchange, thus sending a different signal from said distant exchange to said originating exchange.

4. A system, as claimed in claim 1, in which an off-normal contact of a selector associated with the junction is provided in the means for normally connecting the second relay between the other pole of the source of potential and the other wire of the junction for blocking the circuit when the selector is in an off-normal condition, so as to release said third relay and block the junction to further seizure.

5. A system, as claimed in claim 1, in which a rectifier is provided in series with the third relay between the wires of the junction, so as to prevent the operation of this relay except when the polarity of the current flowing through said third relay is in a predetermined direction.

MARTINUS DEN HERTOG.
CONSTANTINUS DE ZEEUW.

References Cited in the file of this patent

UNITED STATES PATENTS

| Number | Name | Date |
|---|---|---|
| 1,900,969 | Wright | Mar. 14, 1933 |
| 2,277,901 | Brandstetter | Mar. 31, 1942 |
| 2,337,433 | Walsh | Dec. 21, 1943 |
| 2,452,578 | Kurithof | Nov. 2, 1948 |